UNITED STATES PATENT OFFICE.

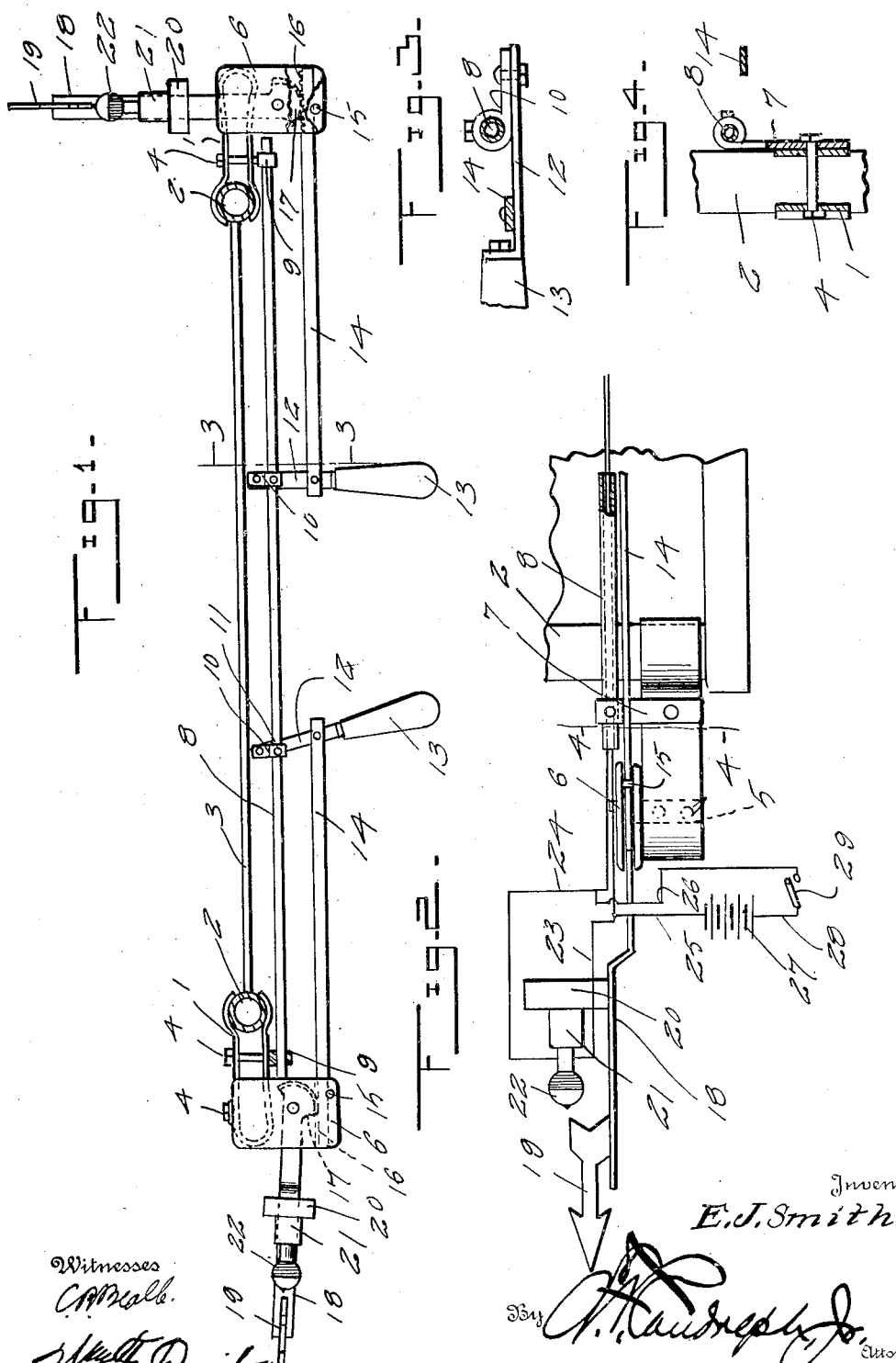

ELWIN J. SMITH, OF ROME, NEW YORK.

AUTOMOBILE DIRECTION-INDICATOR.

1,354,628.   Specification of Letters Patent.   Patented Oct. 5, 1920.

Application filed September 21, 1917. Serial No. 192,497.

*To all whom it may concern:*

Be it known that I, ELWIN J. SMITH, a citizen of the United States, residing at Rome, in the county of Oneida and State of New York, have invented certain new and useful Improvements in Automobile Direction-Indicators; and I do hereby declare the following to be a full, clear, and exact description of the invention, such as will enable others skilled in the art to which it appertains to make and use the same.

This invention relates to improvements in an automobile direction indicator and has for one of its objects the provision of a device of this character whereby the operator of the automobile may readily signal to traffic in front and rear thereof when a turn or stop is contemplated, obviating the custom of putting the hand out of the side of the automobile to indicate or signal the traffic.

Another object of this invention is the provision of signaling members pivotally mounted at each side of the automobile and adapted to be independently swung laterally of the automobile to signal the traffic in front and rear thereof.

A further object of this invention is the provision of operating means located in convenient reach of the operator adapted to operate the signaling members independently of each other.

A still further object of this invention is the provision of an automobile direction indicator of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a top plan view partly in section of an automobile direction indicator constructed in accordance with my invention, Fig. 2 is a fragmentary rear elevation of the same, Fig. 3 is a transverse sectional view taken on the line 3—3 of Fig. 1, and Fig. 4 is a similar view taken on the line 4—4 of Fig. 2.

Referring in detail to the drawing, the numeral 1 indicates clamps which are secured to the sides 2 of a wind shield 3 by set bolts 4. The clamps 1 have secured thereto brackets 5 which extend upwardly and rearwardly from the wind shield and have secured thereon relatively spaced plates 6 that form housings.

Brackets 7 are secured to the clamps 1 and have adjustably secured thereto a supporting rod 8 by means of set screws 9. The supporting rod 8 extends parallel with the wind shield 3 and disposed in the rear thereof. Suitable collars 10 are adjustably secured upon the rod 8 by set screws 11 and have pivoted thereto operating levers 12. The operating levers 12 each carry hand grips 13. Rods 14 are pivoted to the levers 12 and have their free ends disposed between the relatively spaced plates 6 and slidably held therein by means of guide bolts 15 carried by the plates. The free ends of the rods 14 have formed thereon rack teeth 16 which mesh with segments 17 pivoted between the relatively spaced plates 6. The segments 17 have formed thereon arms 18 to which are secured signaling characters 19 that may be in the formation of arrows, hands, or the like. In normal position the arms 18 are disposed forwardly of the wind shield 3 and by swinging the levers 12 upon the pivots, the arms 18 will be moved to extend parallel with the wind shield 3 or laterally of the automobile so that the traffic in front and rear thereof may readily view the same, indicating that a turn is to be made from a straight course.

Casings 20 are secured to the arms 18 and have electric lamp sockets 21 in which are positioned electric lamps 22. The electric lamps 22 are connected in series by conductors 23 and 24. Conductors 25 and 26 are connected to the conductors 23 and 24 respectively and the conductor 25 is connected to the battery or other electrical source 27. A conductor 28 is connected to the battery and to a switch 29 which has connected thereto the conductor 26, whereby upon closing the switch 29, the electric lamps 22 will be illuminated. The ends of the electric lamps are preferably of clear glass, while the remaining portions thereof are coated preferably red, so that when the signals are in a nonsignaling position, a substantially clear light will be displayed in front of the automobile. When the signals are moved into a signaling position, the light will shine through the coated or red portion of the electric lamps 22 of the automobile so as to attract the attention of the approaching and following traffic and indicating to them that a turn from a straight course is contemplated.

While I have shown and described the preferred embodiment of my invention, it will be understood that minor changes in construction, combination and arrangement of parts may be made without departing from the spirit and scope of the invention, as claimed.

Having thus described my invention, what is claimed is:—

A direction indicator comprising a pair of clamps, pairs of spaced plates secured to said clamps and having portions thereof confined between said plates, a supporting rod connecting said clamps, handles pivotally and adjustably connected to said rod, rack bars pivoted to said handles and slidable between the plates, and signals pivoted between said plates and having enlarged pivoted ends provided with teeth that mesh with the rack bar.

In testimony whereof I affix my signature in presence of two witnesses.

ELWIN J. SMITH.

Witnesses:
JANET E. WILLIAMS,
ROBERT W. MIDLAM.